United States Patent [19]

Weber

[11] Patent Number: 4,678,011

[45] Date of Patent: Jul. 7, 1987

[54] END CAP FOR A TUBULAR MEMBER

[75] Inventor: Charles A. Weber, Goshen, Ind.

[73] Assignee: Bock Products, Elkhart, Ind.

[21] Appl. No.: 816,885

[22] Filed: Jan. 7, 1985

[51] Int. Cl.$^4$ .............................................. B65D 59/00
[52] U.S. Cl. ...................................... 138/96 R; 4/323;
220/336
[58] Field of Search ...................... 138/96 R; 220/336;
98/122; 4/323

[56] References Cited

U.S. PATENT DOCUMENTS

| 66,607 | 4/1867 | McGrann | 220/336 |
|---|---|---|---|
| 66,631 | 7/1867 | Ripley | 220/336 |
| 71,748 | 12/1867 | Hare | 220/336 |
| 405,425 | 6/1889 | Lourim | 220/336 |
| 458,264 | 8/1891 | Alliger | 220/336 |
| 606,025 | 6/1898 | Perry | 220/336 |
| 1,402,559 | 1/1922 | Wright | 220/336 |
| 4,133,347 | 1/1979 | Mercer | 4/323 |

FOREIGN PATENT DOCUMENTS

| 714498 | 12/1941 | Fed. Rep. of Germany | 220/336 |
|---|---|---|---|
| 1180244 | 6/1959 | France | 220/336 |

Primary Examiner—Stephen Marcus
Assistant Examiner—Leo Peters
Attorney, Agent, or Firm—James D. Hall

[57] ABSTRACT

An end cap in the form of a plate which is connected by an attachment part to the side wall at the open end of a tubular member. The plate part is pivotal relative to the attachment part and therefore can be rotated between a closed position overlying and spanning the open end of the tubular member, and an open position exposing the open end of the tubular member.

8 Claims, 7 Drawing Figures

U.S. Patent  Jul. 7, 1987  Sheet 1 of 3  4,678,011
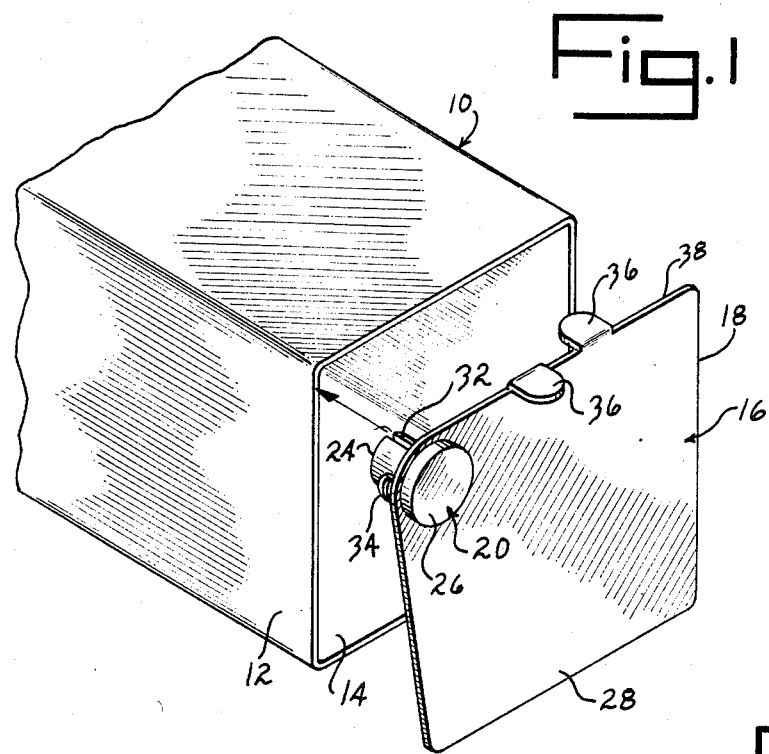
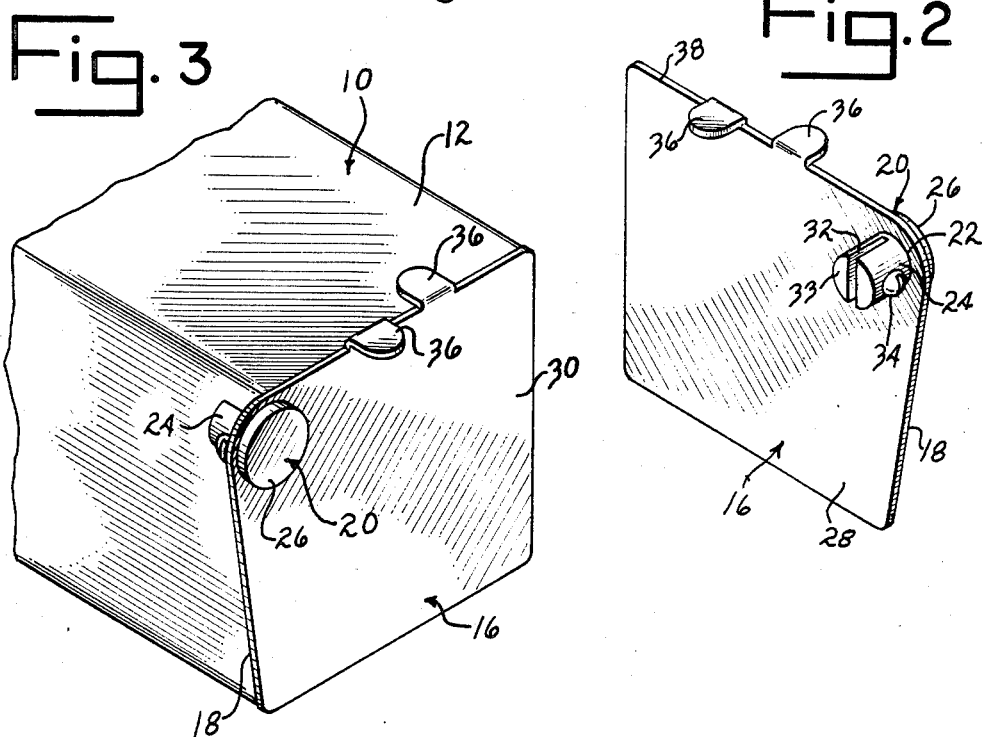

4,678,011

END CAP FOR A TUBULAR MEMBER

SUMMARY OF THE INVENTION

This invention relates to an end cap which is utilized to close the open end of a tubular member and will have specific but not limited application to closing off the ends of what are known as hose bumpers typically found on motor homes and similar type recreational vehicles.

Heretofore, the ends of the hose bumpers, which are of tubular shape, have been closed by plugs, over-fitting caps, or similar type of covers. Such prior art covers have commonly been lost and have a tendency to lose their shape if made from rubber, or similar flexible material, making use of such covers difficult. In this invention, the end cap is of a plate construction which is simply and efficiently pivotally connected to the side wall of the tubular bumper. The cap, when so connectd to the bumper, can be pivoted from a closed position spanning or overlying the bumper end to an open position which exposes the bumper end while remaining at all times connected to the bumper. Additionally, the cap member is constructed so as to be reversibly attached to the bumper or tubular member so as to enable it to be swung either left or right relative to the bumper end into its open position at the selection of the installer of the cap.

Accordingly, it is an object of this invention to provide an end cap which is for hose bumper and which can be simply and quickly installed by the use of a screwdriver.

Another object of this invention is to provide an end cap which is for a hose bumper and which is of simple but efficient operation.

Still another object of this invention is to provide an end cap which is for a tubular member and which is of economical construction and simplified operation.

Other objects of this invention will become apparent upon a reading of the following description.

BRIEF DESCRIPTION OF THE DRAWINGS

A preferred embodiment of this invention has been chosen for purposes of illustration and description wherein:

FIG. 1 is a perspective view of one side of the end cap shown in detached form from the tubular member.

FIG. 2 is a perspective view of the opposite side of the end cap.

FIG. 3 is a perspective view of the end cap attached to the tubular member shown in FIG. 1.

DESCRIPTION OF THE PREFERRED EMBODIMENT

Figure 4:
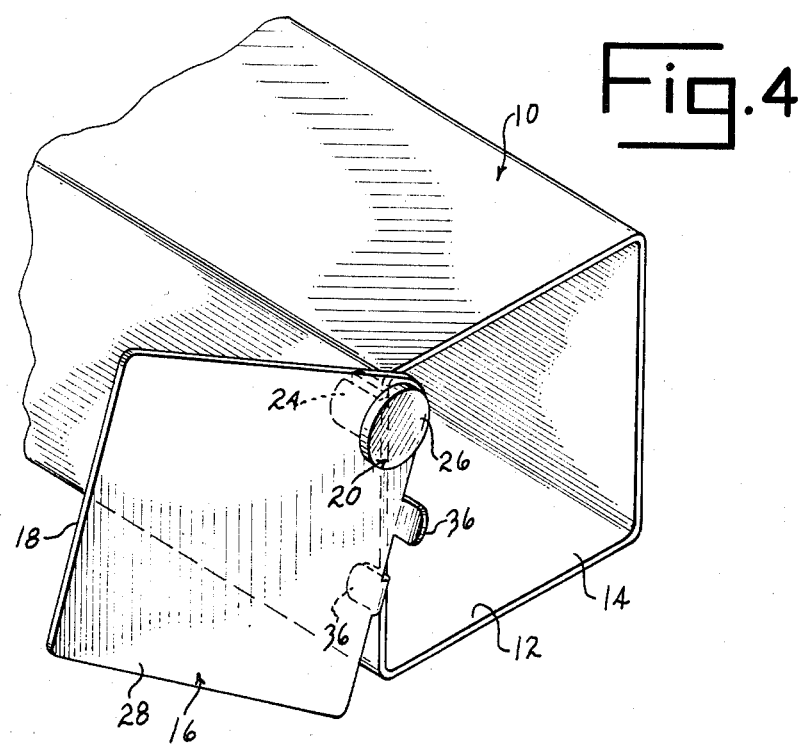
FIG. 4 is a perspective view showing the end cap in its open position while attached to the tubular member.
Figure 5:
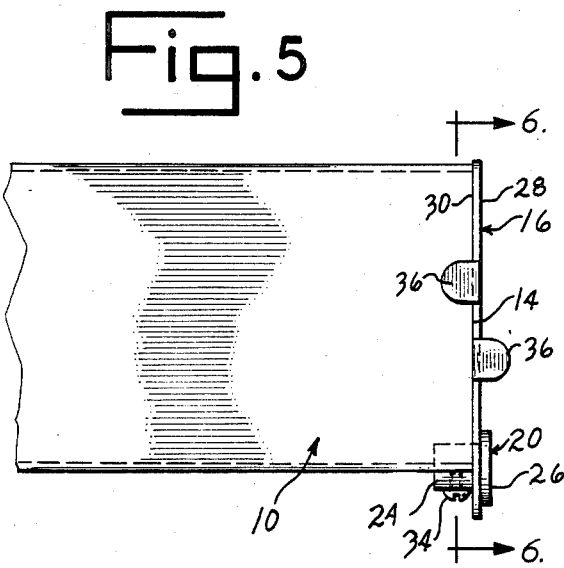
FIG. 5 is a top view of the end cap.
Figure 6:
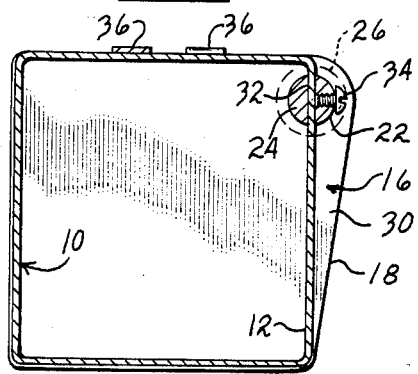
FIG. 6 is a cross sectional view taken along line 6—6 of FIG. 5.

The preferred embodiment hereinafter illustrated is not intended to be exhaustive or to limit the invention to the precise form disclosed. It is chosen and described in order to best explain the principles of the invention and its application and practical use to thereby enable others skilled in the art to best utilize the invention.

Tubular member 10, which may form a hose bumper of a motor vehicle, such as a motor home, or which may form any other type of tubular construction, includes a side wall 12 which defines an open end 14. Mounted to tubular member 10 is an end cap 16. Cap 16 is used to close the open end 14 of tubular member 10 which can allow the tubular member to be utilized for storage purposes. For motor homes and similar types of vehicles, it is common to house the waste tank dumping hose within the interior of the tubular member which in this construction serves as a hose bumper for the vehicle.

End cap 16 is designed, as will be later described, so that it can be installed at either end of a tubular member, and can be pivoted between its open and closed positions to either the right or to the left of the tubular member, depending upon the wishes of the installer of the end cap. For hose bumpers, this permits the end cap to be pivoted either toward or away from the vehicle body and thereby avoids the problem of the cap contacting the vehicle body and thus being prevented from being fully opened. End cap 16 includes a plate part 18, which may be formed of steel or a similar durable construction, and an attachment part 20.

One upper corner of plate part 18 of end cap 16 is formed with an opening 22. Attachment part 20 of the end cap includes a cylindrical shank 24 and an enlarged flattened head 26. Shank 24 of the attachment part is fitted freely through opening 22 in plate part 18 with the shank extending outwardly from one side 28 of the plate part and with head 26 abutting the opposite side 30 of the plate part. Shank 24 is formed with a slot 32 extending axially from its end face 33 and having a width to just slidably accomodate the thickness of side 12 of tubular member 10 when the shank is abuttedly fitted over the open end 14 of the tubular member. A set screw 34 is threaded into shank 24 of the attachment part so as to protrude into its slot 32. With shank 24 of the attachment part straddling side wall 12 of tubular member 10 at its open end 14, set screw 34 can be tightened against the side wall so as to secure the attachment part to the tubular member. When so attached, as illustrated in the accompanying figures, the plate part is pivotal relative to the attachment part about its shank 24 within opening 22 between a closed position, as seen in FIG. 3, spanning or enclosing the open end 14 of tubular member 10 and an open position, as seen in FIG. 4, exposing the open end of the tubular member.

Plate part 18 includes reverse bent tabs 36 at its upper edge 38. Tabs 36 serve as an abutment or stop which in contacting the upper edge of the tubular member at its open end 14 positions the plate part 18 in its closed position and as a stop to locate the cap in its open position. Since the rearwardly extending tab 36 acts as the abutment or stop, the forwardly extending tab 36 can be utilized as a handle or grip which enables the user of the cap to pivot the cap between its opened and closed positions. By grasping tab 36 the user can pivot the cap in a counterclockwise arcuate direction from the closed position shown in FIG. 3 to the open position shown in FIG. 4 with rearwardly extending tab 36 being utilized as a stop. Clockwise movement of plate part 18 from its open position in FIG. 4 to its closed position in FIG. 3 finds rearwardly extending tab 36 also acting as a stop to maintain the plate part in its closed position.

Figure 7:
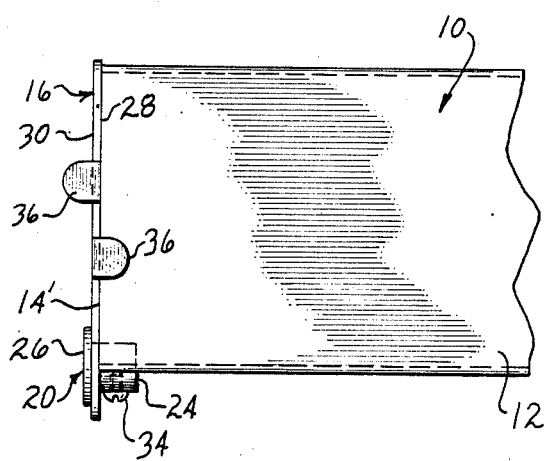
FIG. 7 is a top view like FIG. 5 but with the end cap shown attached to the opposite end of the tubular member.

In FIG. 7, plate part 18 has been reversed in location with the attachment part located in opening 22 of the plate part so that its shank 24 projects forwardly now of side 30 which is positioned against the opposite open end 14' of tubular member 10. This reversible feature allows the cap to be installed on either end of tubular member 10 and also permits the cap to be pivoted either right or left into its open position depending upon the orientation of attachment part 20. The position of the attachment part can be simply reversed by the removal of set screw 34 and the withdrawal of the attachment part from opening 22 and its repositioning into the plate part opening from the opposite side of the plate part 18. The screw then is turned into its threaded opening in shank 24 of the attachment part with the end cap now being readied for attachment either in reverse orientation to or at the opposite end of the tubular member.

While tubular member 10 is shown in a square form, end cap 16 can be utilized with tubular members having a rectangular or cylindrical side wall. For use with a cylindrical side wall, the slot formed in shank 24 of the end cap need be curved so as to accomodate the angular outline of the tubular member sidewall.

It is to be understood the invention is not to be limited to the details above given, but may be modified with the scope of the appended claims.

What I claim is:

1. In combination, a tubular member having a side wall defining an open end, an end cap carried by said tubular member and removably overlying said tubular member open end, said cap comprising a plate part and an attachment part pivotally carried by said plate part, said attachment part secured to said tubular member side wall and constituting means for permitting said plate part to be pivoted relative to the attachment part between a closed position overlying said tubular member open end and an open position exposing said tubular member open end, said attachment part including a shank and a head, said plate part having an opening, said attachment part shank extending through said plate part opening with said attachment part head abutting said plate part, said attachment part shank including a terminal end face and having a slot form therein extending longitudinally from said end face towards said attachment part head, said attachment part shank fitted at said slot about said tubular member side wall at its said open end, a securement device carried by said attachment part shank and contacting said tubular member side wall to connect the attachment part shank to said tubular member side wall.

2. The end cap of claim 1 wherein said securement device is a screw turned into said attachment means shank at said slot therein into abutment with said tubular member side wall.

3. In combination, a tubular member having a side wall defining an open end, an end cap carried by said tubular member and removably overlying said tubular member open end, said cap comprising a plate part and an attachment part pivotally carried by said plate part, said attachment part secured to said tubular member side wall and constituting means for permitting said plate part to be pivoted relative to the attachment part between a closed position overlying said tubular member open end and an open position exposing said tubular member open end, said attachment part including a shank and a head, said plate part having an opening, said attachment part shank extending through said plate part opening with said attachment part head abutting said plate part, said attachment part shank connected to said tubular member side wall, and means for positioning said plate part in its said closed position, said positioning means being oppositely extending tabs projecting at generally right angles to the plate part, one of said tabs overlyingly contacting said tubular member side wall when said plate part is in its said closed position.

4. The end cap of claim 3 wherein said one of said tabs overlyingly contacting tubular member side wall when said plate part is in its open position.

5. A cap for closing the end of a tubular member having a side wall defining an open end into the tubular member, said cap comprising a plate part and an attachment part pivotally carried by said plate part, said attachment part adapted for securement to said tubular member side wall and constituting means for permitting said plate part to be pivoted relative to the attachment part between a closed position overlying said tubular member open end and an open position exposing the tubular member open end, said attachment part including a shank and a head, said attachment part shank extending through said plate part opening with said attachment part head abutting said plate part, said attachment part shank including a terminal end face and having a slot formed therein extending longitudinally from said end face towards said attachment part head, said attachment part shank adapted to be fitted at said slot about said tubular member side wall at its said open end, securement means carried by said attachment part shank for contacting said tubular member side wall to connect the attachment part shank to the tubular member side wall.

6. The cap of claim 5 wherein said securement means is a screw turned into said attachment part shank at said slot for abutment with said tubular member side wall.

7. A cap for closing the end of a tubular member having a side wall defining an open end into the tubular member, said cap comprising a plate part and an attachment part pivotally carried by said plate part, said attachment part adapted for securement to said tubular member side wall and constituting means for permitting said plate part to be pivoted relative to the attachment part between a closed position overlying said tubular member open end and an open position exposing the tubular member open end, said attachment part including a shank and a head, said plate part having an opening, said attachment part shank extending through said plate part opening with said attachment part head abutting said plate part, said attachment part shank adapted for connection to said tubular member side wall, means for positioning said plate part in its closed position when said attachment part is secured to said tubular member, said positioning means being oppositely extending tabs projecting at generally right angles to the plate part, one of said tabs for overlyingly contacting said tubular member side wall when said plate part is in its said closed position and said attachment part is secured to said tubular member.

8. The cap of claim 7 wherein said one of said tabs overlyingly contacting said tubular member side wall when said plate part is in its open position and said attachment part is secured to said tubular member.

* * * * *